(12) United States Patent
Jensen

(10) Patent No.: US 6,478,363 B2
(45) Date of Patent: Nov. 12, 2002

(54) PROTECTIVE COVER DEVICE FOR USE WITH A SNOWMOBILE

(76) Inventor: Peter Jensen, 3801 Euclid Ave., Madison, WI (US) 53711

(*) Notice: Subject to any disclaimer, the term of this patent is extended or adjusted under 35 U.S.C. 154(b) by 0 days.

(21) Appl. No.: 09/784,562

(22) Filed: Feb. 15, 2001

(65) Prior Publication Data

US 2002/0109373 A1 Aug. 15, 2002

(51) Int. Cl.$^7$ .............................................. B60J 11/00
(52) U.S. Cl. ...................................................... 296/136
(58) Field of Search ......................... 296/136; 280/770; 135/88.03, 88.04; 160/19

(56) References Cited

U.S. PATENT DOCUMENTS

| | | |
|---|---|---|
| 5,006,087 A | 4/1991 | Peterson |
| 5,458,945 A | 10/1995 | Tall |
| 5,632,223 A * | 5/1997 | Bray et al. .................. 114/361 |
| 5,720,312 A | 2/1998 | Scheuermann |
| 5,921,389 A * | 7/1999 | Zoffer .......................... 206/335 |
| 5,983,570 A | 11/1999 | Brown |
| 6,129,408 A | 10/2000 | Schultz et al. |
| 6,170,589 B1 | 1/2001 | Kawano et al. |

OTHER PUBLICATIONS

Sled Bed Newmans Manufacturing Inc. p. 5 (No date).
Toy Carrier. Plastic Covers for Trailers. Agriplastics (No date).
2001 Snow Body Chassis. p. 130 (No date).
Slick Slides. Trailer Guide System. Recreational Stuff Inc. (No date).
Cover All. The Second Generation (No date).
Slush Guard J & P Enterprises. (No date).
Floe Versa—Max Trailers & Protektor Enclosures. (No date).
Expedition Enclosed Aluminum Snowmobile Trailers. (No date).
Body Cover Maxima. Scheer Madness. (No date).
Slush Guard & The Body Cover. p. 74 Trailer/Sleigh. (No date).

* cited by examiner

Primary Examiner—Joseph D. Pape
Assistant Examiner—G Blankenship
(74) Attorney, Agent, or Firm—David J. Archer (57) ABSTRACT

A protective cover device is disclosed for use with a snowmobile having an engine compartment, windshield, handlebars, seat, track and skis. The protective cover is used for protecting the snowmobile from the elements during transportation thereof. The device includes a first portion for covering and protecting the engine compartment, windshield, handlebars and seat of the snowmobile. A second portion covers the track and skis. An arrangement is provided for removably sealing the first and second portions together such that when the first and second portions are sealed together, the first and second portions define therebetween an enclosure for the snowmobile. The arrangement is such that during transportation of the snowmobile, ingress of the elements such as $H_2O$, snow, slush and road contaminants onto the snowmobile is inhibited. The protective cover device enables the snowmobile to be completely protected and insulated from the elements that would otherwise tend to damage, corrode and reduce the usefulness of the snowmobile in the absence of the cover device.

17 Claims, 9 Drawing Sheets

PROTECTIVE COVER DEVICE FOR USE WITH A SNOWMOBILE

BACKGROUND OF THE INVENTION

1. Field of the Invention

The present invention relates to a protective cover device for use with a snowmobile having an engine compartment, windshield, handlebars, seat, track and skis. More particularly, the present invention relates to a protective cover device for use with a snowmobile which completely covers all of the snowmobile.

2. Background Information

A snowmobile is usually towed to a snowmobile trail by means of a trailer towed behind a truck or the like. During such transportation, slush and other corrosive road materials are sprayed onto the snowmobile from the tires of the truck and from other road vehicles. Such transportation is nearly always carried out when snow has fallen and when the roads have been treated with a mixture of sand and salt. The exposure of a snowmobile to the abrasive effects of sand and the corrosive damage caused by salt and $H_2O$ liquid, rapidly depreciates the value of the snowmobile and can be responsible for mechanical failure thereof. Such exposure renders the snowmobile difficult, undesirable and unappealing to operate due to its generally dirty condition.

Although various covers have been proposed for protecting snowmobiles during transportation, such covers have greatly increased the combined weight that must be transported. Typical covers include fiberglass boxes having doors for loading and unloading the snowmobile. Therefore, in addition to the weight of the trailer and the snowmobile, the added weight of the fiberglass container may exceed the recommended maximum weight carrying capability of the trailer. If the weight capacity of the trailer is exceeded, there is not only a potential possibility of an accident but also, there is a tendency for the wheel bearings and tires of the trailer to fail. The aforementioned problems are multiplied when several snowmobiles and associated gear must be transported on the trailer.

Consequently, many users of snowmobiles have used canvas covers during transportation. While such prior art covers overcome the weight problem, Applicant is unaware of any light weight cover that completely protects and encloses the snowmobile during transportation. The prior art covers expose the skis and track of the snowmobile to the deleterious effects of the elements so that not only are the maintenance cost of the snowmobile increased but also, the market value of the snowmobile is rapidly depleted. Also, the prior art covers expose the skis, track, running boards and a major portion of the covered portion of the snowmobile due to the loose fitting and porous nature of such covers.

To the contrary, when a snowmobile is covered by the protective cover device according to the present invention, the snowmobile is completely insulated from the environment so that maintenance of the machine is minimized and the value of the snowmobile is maintained for many years. Also, the cover according to the present invention maintains a generally clean appearance of the snowmobile.

Therefore, it is a primary feature of the present invention to provide a protective cover device that overcomes the problems associated with the prior art arrangements.

Another feature of the present invention is the provision of a protective cover device that facilitates protection of a snowmobile during transportation thereof.

A further feature of the present invention is the provision of a protective cover device that maintains the value and increases the life of a snowmobile.

Another feature of the present invention is the provision of a protective cover device that permits complete protection of a snowmobile from the elements during transportation.

Another feature of the present invention is a reduced dependence on a specific trailer as the cover is specific to the snowmobile and not to the trailer.

Also, another feature of the present invention is the provision of a protective cover device that utilizes or accommodates conventional systems for fastening the snowmobile to a trailer during transportation.

Also, another feature of the present invention is the provision of a protective cover device which permits the covered status of the snowmobile to be achieved with any method of transportation.

The device according to the present invention reduces the dependence of the user on a particular trailer and achieves the covered status without overloading the trailer. Consequently, the trailer can be traded or changed without concern for retaining the coverability of the snowmobile. Also, the device can be used with conventional trailers and tie downs. The device increases the carrying capacity of the trailer and reduces maintenance of the trailer. Furthermore, the usage of the trailer is more universal when compared with trailers provided with hinged box type covers. Additionally, the cover device can be used for storage of the snowmobile independently of the trailer.

Other features and advantages of the present invention will be readily apparent to those skilled in the art by a consideration of the detailed description of a preferred embodiment of the present invention contained herein.

SUMMARY OF THE INVENTION

The present invention relates to a protective cover device for use with a snowmobile having an engine compartment, windshield, handlebars, seat, track and skis. The protective cover is used for protecting the snowmobile from the elements during transportation thereof. The device includes a first portion for covering and protecting the engine compartment, windshield, handlebars and seat of the snowmobile. A second portion covers the track and skis. Means are provided for removably sealing the first and second portions together such that when the first and second portions are sealed together, the first and second portions define therebetween an enclosure for the protection of the snowmobile. The arrangement is such that during transportation of the snowmobile, ingress of the elements such as snow, slush and road contaminants such as sand, $H_2O$ and salt onto the snowmobile is inhibited. The protective cover device enables the snowmobile to be completely protected and insulated from the elements that would otherwise tend to damage, corrode and reduce the usefulness of the snowmobile in the absence of the cover device.

In a more specific embodiment of the present invention, the first portion includes a plurality of sections, the sections being secured relative to each other so that the first portion conforms to the contour of the engine compartment, windshield, handlebars and seat of the snowmobile.

Furthermore, the sections are secured relative to each other by stitching and the sections are fabricated from a waterproof reinforced material.

More particularly, the plurality of sections includes at least a first and a second section for covering the engine compartment and at least a third section for covering the windshield. At least a fourth section is provided for covering the handlebars and at least a fifth section covers the seat.

The fifth section defines a selectively closable opening for permitting refueling of the snowmobile during transportation thereof without having to remove the first portion. Also, the fifth section further defines a storage compartment.

Additionally, the second portion includes a first pocket for the reception therein of one of the skis of the snowmobile. A second pocket is provided for the reception therein of the other ski of the snowmobile. A panel is permanently secured to the first and second pockets for covering and protecting the track of the snowmobile from the elements.

The first and second pockets are secured to the panel by stitching and the first and second pockets and the panel are fabricated from a durable reinforced waterproof material.

Also, the means for removably sealing the first and second portions together includes a zipper. The zipper has a first row of zipper teeth secured to the first portion and a second row of zipper teeth secured to the second portion. The first and the second row of zipper teeth cooperate with each other for selectively sealing the first and second portions together, Additionally, a flap is provided for covering the zipper when the first and second portions are sealed together. The flap is arranged such that in a first disposition thereof, the flap is folded over the first and second rows of zipper teeth. In a second disposition of the flap, the flap is folded back to expose the first and second row of teeth so that unzipping of the rows of teeth is facilitated. Moreover, a hook and loop or VELCRO type fastener is provided for fastening the flap in the first disposition thereof. VELCRO is a Registered Trademark of Velcro Industries B.V.

In another embodiment of the present invention, a hook and loop type fastener is used for fastening and sealing the first and second portions together.

The protective cover also includes several cinch straps, each strap having a first and a second end. The first ends of the cinch straps are secured to the first portion. Also, the second ends of the cinch straps are threaded around and under the second portion and are removably fastened to the respective first portions on the opposite side of the snowmobile for preventing billowing of the first portion during transportation of the snowmobile. Alternatively, the second ends of the cinch straps are sewn in place or are threaded through belt loops.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

FIG. 4 is a similar view to that shown in FIG. 2. However, FIG. 4 shows a second portion of the cover device fitted under the snowmobile;

Similar reference characters refer to similar parts throughout the various drawings.

DETAILED DESCRIPTION OF THE DRAWINGS

Figure 1:
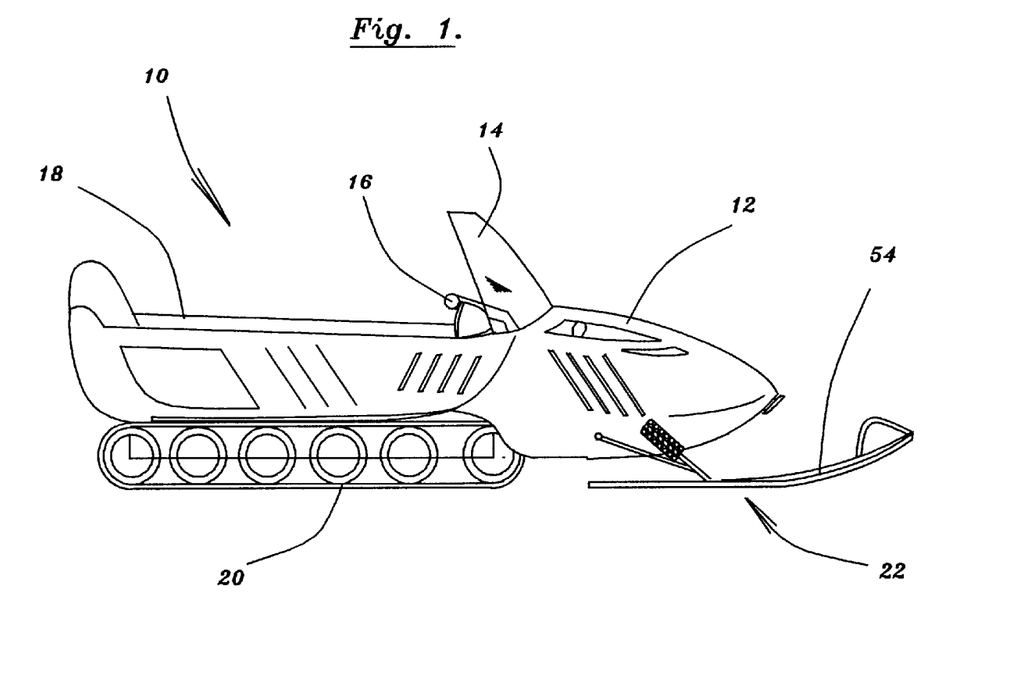
FIG. 1 is a side elevational view of a typical snowmobile

FIG. 1 is a side elevational view of a typical snowmobile generally designated 10. The snowmobile has an engine compartment 12, windshield 14, handlebars 16, seat 18, track 20 and skis generally designated 22.

Figure 2:
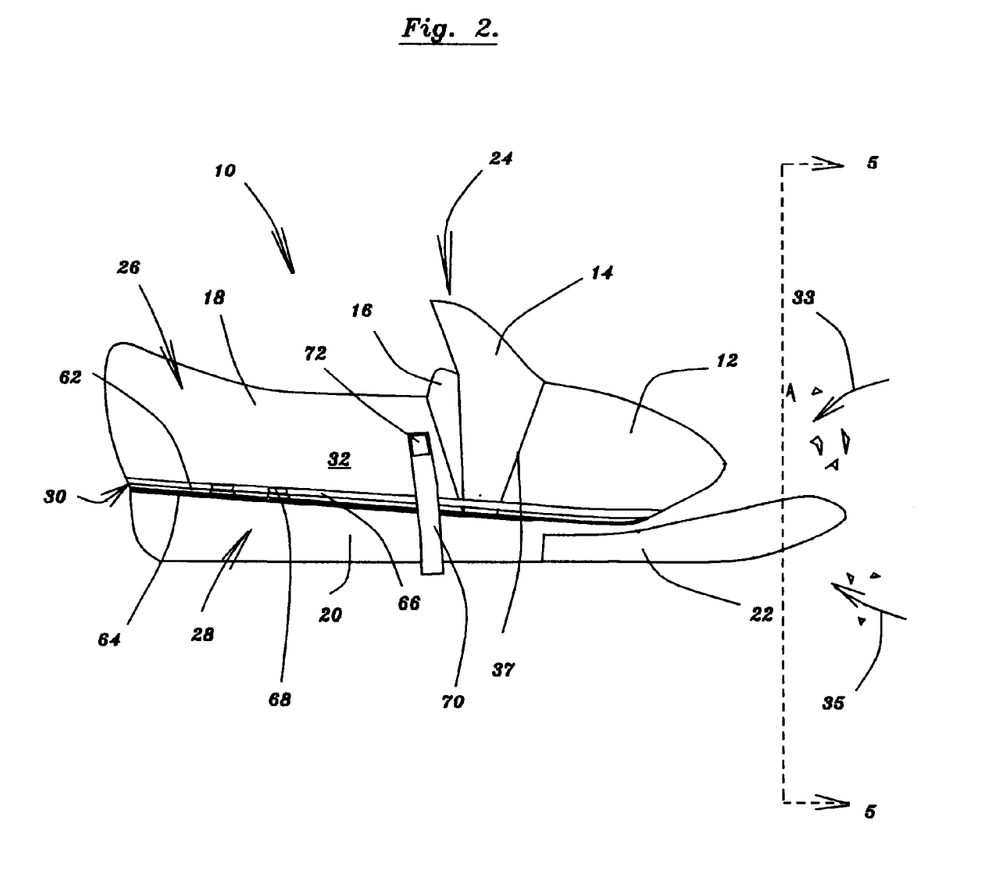
FIG. 2 is a side elevational view similar to FIG. 1 but shows the snowmobile of FIG. 1 enclosed in a protective cover device according to the present invention.

FIG. 2 is a side elevational view similar to that shown in FIG. 1 but shows the snowmobile enclosed in a protective cover generally designated 24 according to the present invention. The cover 24 is used for protecting the snowmobile 10 from the elements during transportation thereof. The cover device 24 includes a first portion generally designated 26 for covering and protecting the engine compartment 12, windshield 14, handlebars 16 and seat 18 of the snowmobile 10. A second portion generally designated 28 covers the track 20 and skis 22. An arrangement generally designated 30 is provided for removably sealing the first and second portions 26 and 28 respectively together such that when the first and second portions 26 and 28 are sealed together, the first and second portions 26 and 28 define therebetween an enclosure 32 for the snowmobile 10. The arrangement is such that during transportation of the snowmobile 10, ingress of the elements as indicated by arrows 33 and 35, such as snow, slush and road contaminants including sand, salt and $H_2O$ onto the snowmobile 10 is inhibited. The protective cover device 24 enables the snowmobile 10 to be completely protected and insulated from the elements that would otherwise tend to damage corrode and reduce the usefulness of the snowmobile 10 in the absence of the cover device 24.

Figure 3:
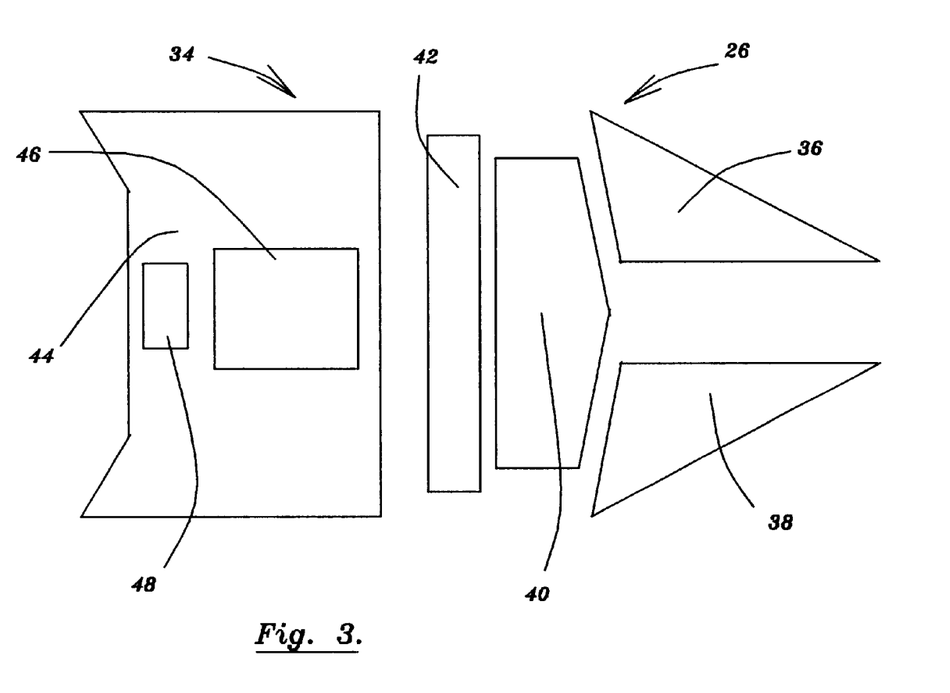
FIG. 3 is a top plan view of a first portion of the cover device shown in FIG. 2.

A FIG. 3 is a top plan view of the first portion 26. As shown in FIG. 3 the first portion 26 includes a plurality of sections generally designated 34, the sections 34 being secured relative to each other as shown in FIG. 2, so that the first portion 26 conforms to a contour of the engine compartment 12, windshield 14, handlebars 16 and seat 18 of the snowmobile 10 as shown in FIG. 2. As shown in FIG. 2, the abutting edges of the sections 34 are secured relative to each other by stitching 37 and the sections 34 are fabricated from a waterproof reinforced material.

More particularly, as shown in FIG. 3, the plurality of sections 34 includes at least a first and a second section 36 and 38 respectively for covering the engine compartment 12 and at least a third section 40 for covering the windshield 14. At least a fourth section 42 is provided for covering the handlebars 16 and at least a fifth section 44 covers the seat 18.

The fifth section 44 defines a selectively closable opening 46 for venting and for permitting refueling of the snowmobile 10 during transportation thereof without having to remove the first portion 26. Also, the fifth section 44 further defines a storage compartment 48 for tools, cinch straps, maps or the like.

Figure 4:
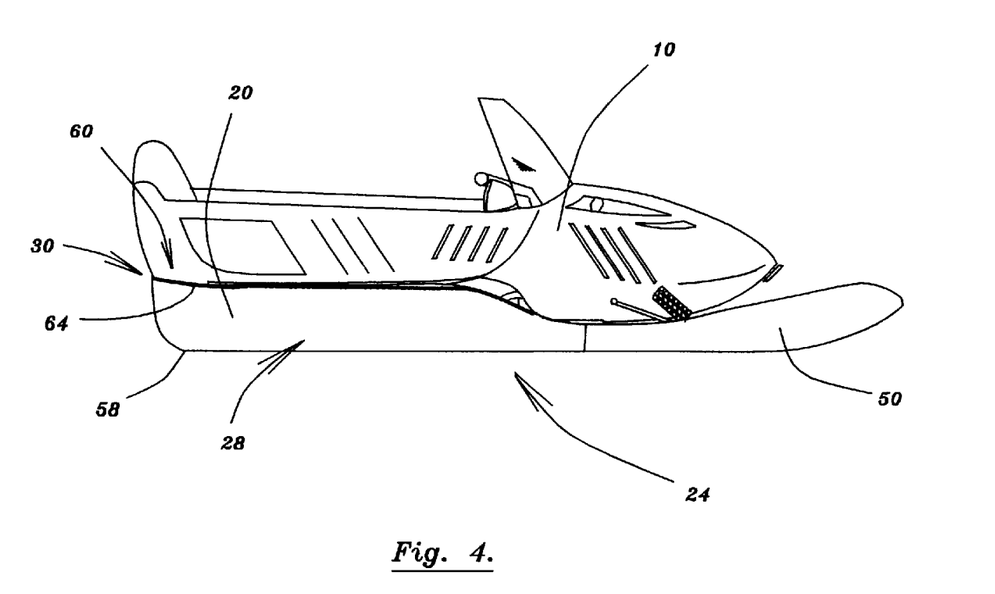

FIG. 4 is a similar view to that shown in FIG. 2. However, FIG. 4 shows particularly the second portion 28 of the cover device 24. As shown in FIG. 4, the second portion 28 includes a first pocket 50 for the reception therein of one of the skis 54 of the snowmobile 10 shown in FIG. 1.

Figure 5:
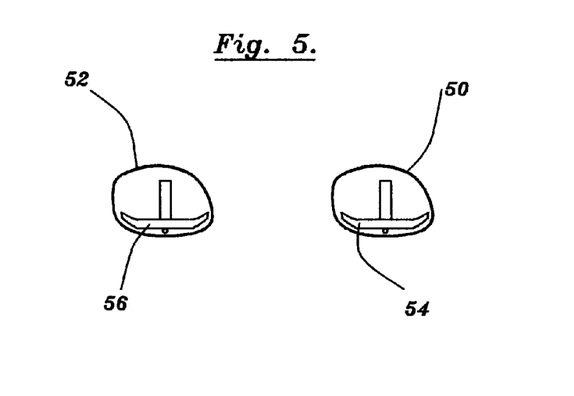
FIG. 5 is a view taken on the line 5—5 of FIG. 2.

FIG. 5 is a view taken on the line 5—5 of FIG. 2. As shown in FIG. 5, a second pocket 52 is provided for the reception therein of the other ski 56 of the snowmobile 10. Also, as shown in FIG. 4, a panel 58 is permanently secured to the first and second pockets 50 and 52 respectively for covering and protecting the track 20 of the snowmobile 10 from sand, salt and $H_2O$ as indicated by a the arrows 33 and 35.

The first and second pockets 50 and 52 respectively are secured to the panel 58 by stitching and the first and second pockets 50 and 52 and the panel 58 are fabricated from a durable reinforced waterproof material.

Figure 6:
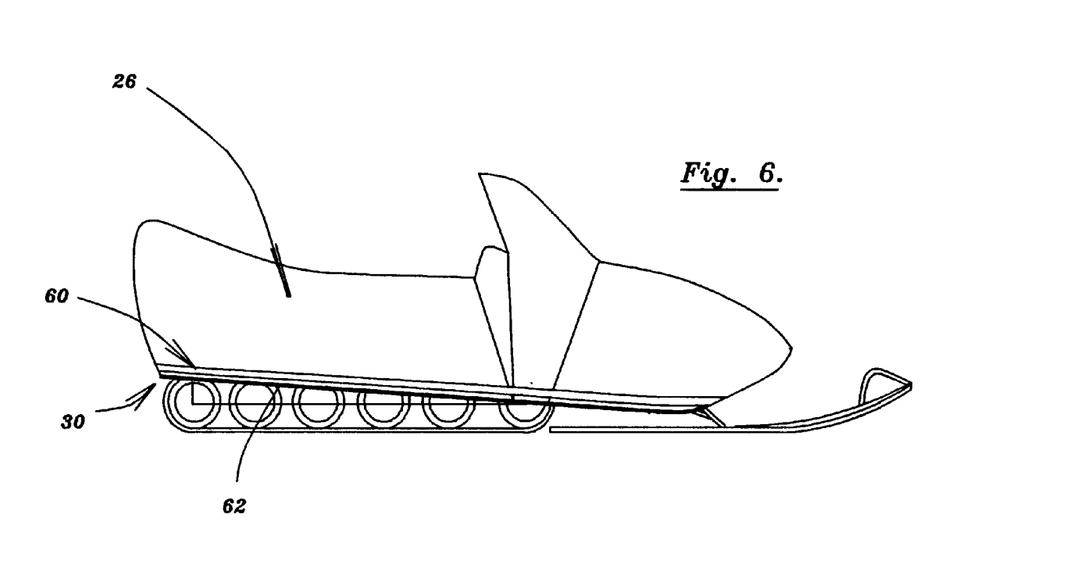
FIG. 6 is a similar view to that shown in FIG. 2 but shows the first portion of the cover device fitted over the snowmobile.

FIG. 6 is a similar view to that shown in FIG. 2 but shows only the first portion 26 fitted over the snowmobile whereas FIG. 4 shows the second portion 28 fitted under the track 20 and skis 22 without the first portion 26 fitted. As shown in FIGS. 4 and 6, the arrangement or means 30 for removably sealing the first and second portions 26 and 28 together includes a zipper generally designated 60. The zipper 60 includes a first row of zipper teeth 62 secured to the first portion 26. As shown in FIG. 4, a second row of zipper teeth 64 is secured to the second portion 28. The first and the second row of zipper teeth 62 and 64 respectively cooperate with each other for selectively sealing the first and second portions 26 and 28 together as shown in FIG. 2.

Figure 7:
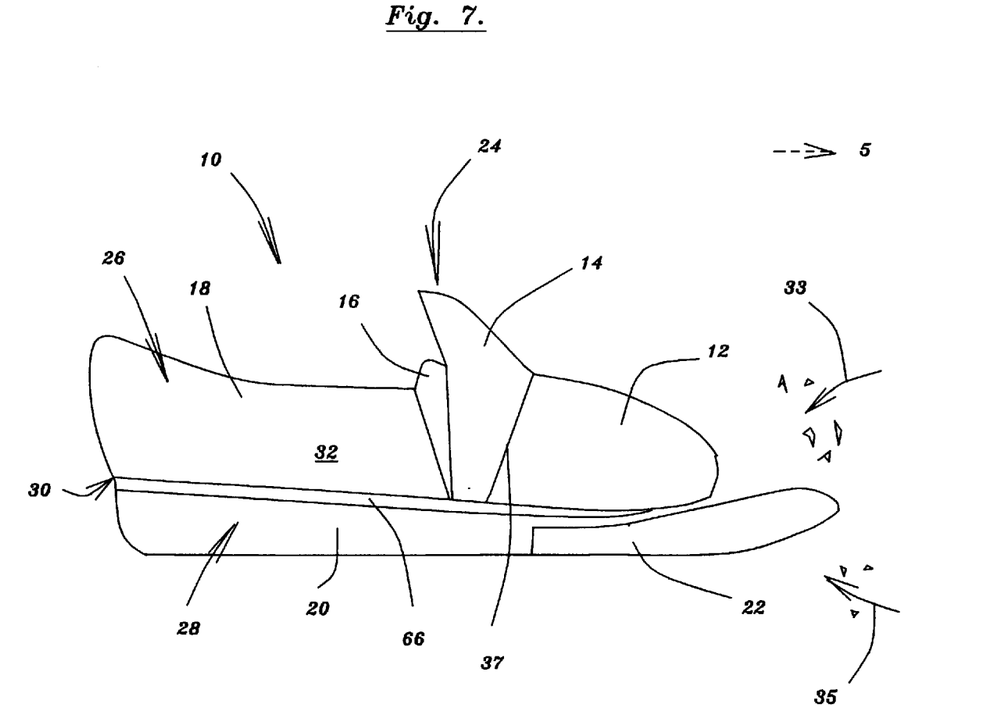
FIG. 7 is a similar view to that shown in FIG. 2. but with a flap in a first disposition thereof.

FIG. 7 is a similar view to that shown in FIG. 2. As shown in FIG. 7, a flap 66 is provided for covering the zipper 60 when the first and second portions 26 and 28 are sealed together. The flap 66 is arranged such that in a first disposition thereof, as shown in FIG. 7, the flap 66 is folded over the first and second rows of zipper teeth 62 and 64 respectively. In a second disposition of the flap 66 as shown in FIG. 2, the flap 66 is folded back to expose the first and second row of teeth 62 and 64 respectively so that unzipping of the rows of teeth 62 and 64 is facilitated.

Moreover, as shown particularly in FIG. 2, a hook and loop type fastener 68 is provided for fastening the flap 66 in the first disposition thereof as shown in FIG. 7.

Figure 8:
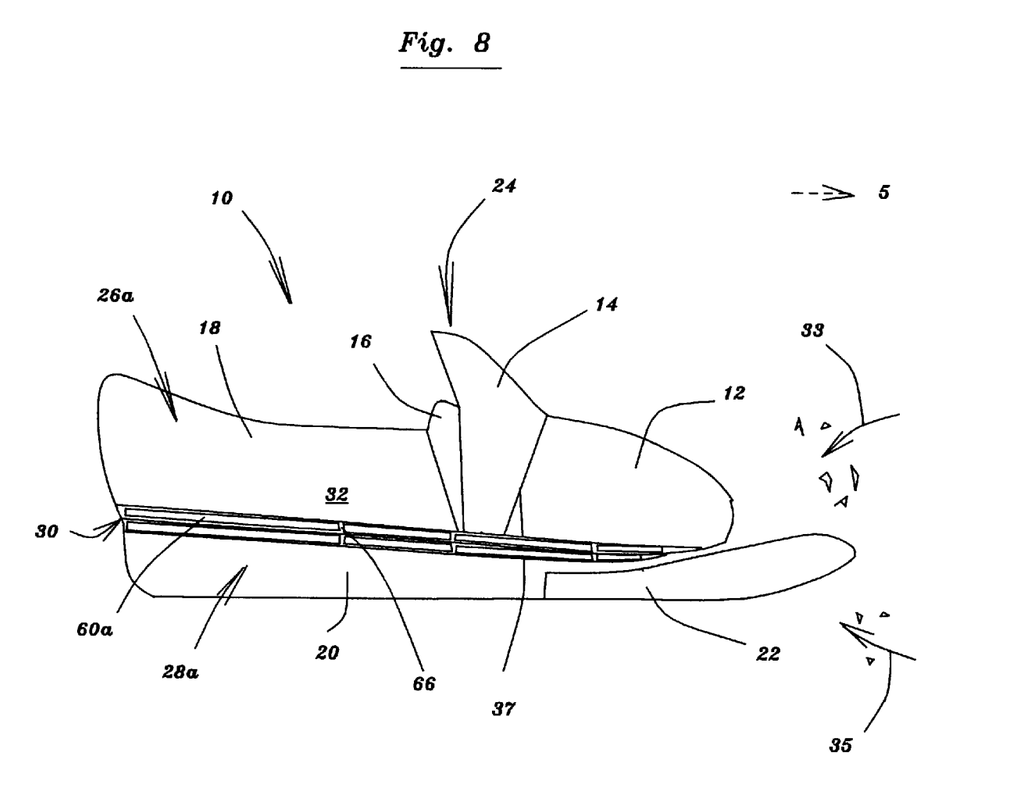
FIG. 8 is a similar view to that shown in FIG. 2. but showing another embodiment of the present invention.

FIG. 8 is a similar view to that shown in FIG. 2. However, FIG. 8 shows another embodiment of the present invention in which a hook and loop type fastener 60*a* is used for fastening and sealing the first and second portions 26*a* and 28*a* together.

Figure 9:
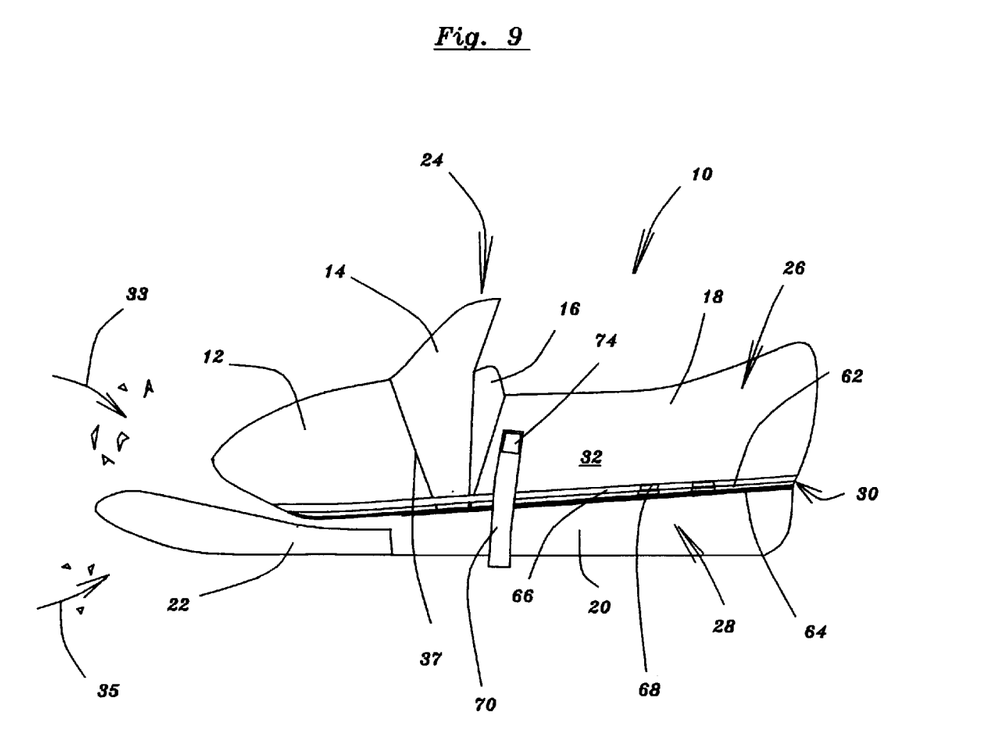
FIG. 9 is a similar view to that shown in FIG. 2 but viewed from the opposite side of the snowmobile.

The protective cover 24 as shown in FIG. 2 also includes a cinch strap 70 having a first end 72. FIG. 9 is a view from the opposite side of the snowmobile and shows a second end 74 of the cinch strap 70. The first end 72 of the cinch strap 70 is permanently secured to the first portion 26. Also, the second end 74 of the cinch strap 70 is threaded under and around the second portion 28 and is removably fastened to the first portion 26 on the opposite side of the snowmobile 10 for preventing billowing of the first portion 26 during transportation of the snowmobile 10.

Figure 10:
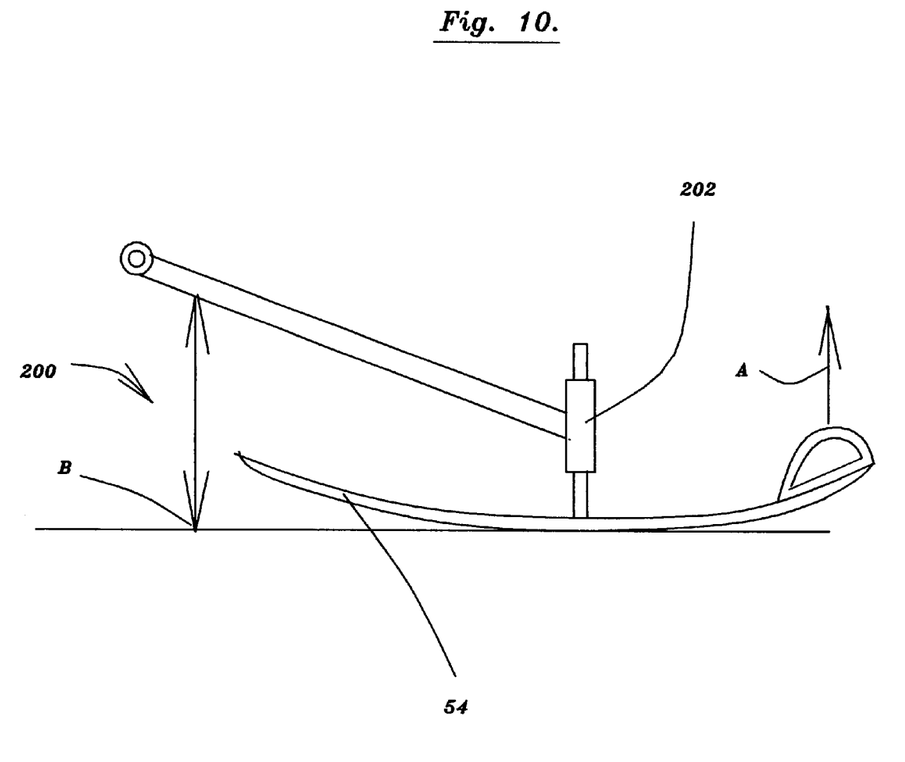
FIG. 10 is an enlarged right hand side elevational view of a ski of the snowmobile to illustrate how such ski is lifted.

FIG. 10 is an enlarged right hand side elevational view of the ski of the snowmobile or sled, to illustrate how such ski is lifted. As shown in FIG. 10, the support device or jack 200 that is used to hold the sled up off the trailer has two modes of operation. The first mode is the retraction mode and the second mode is the extension/support mode.

In the retraction mode, the jack 200 will hold its position until the weight that it is supporting is removed. Once the weight is removed, the jack will retract to its shortest position and remain there.

When the jack 200 is in the extension/support position, the jack extends until the distance between the jack and the suspension component is taken up. Once the distance is taken up, the jack pushes up on the suspension component with enough force to maintain its position but not to lift the sled. When the sled and the suspension component are lifted, using the ski 54 and spindle 202 as a lever, the jack 200 follows the suspension component upward and holds the new elevated position.

Raising the skis 54 and 56 from their at rest position needs to be done in order to install the pockets as well as for maintenance, inspection and repair of the snowmobile as called out in the service manuals.

In operation of the jack 200 to lift the sled, in order to raise the sled, the jack, in the retracted mode, is positioned underneath the suspension component to be lifted and slightly behind the end of the ski 54 at a location B shown in FIG. 10. The operation is repeated for the opposite side.

The jack 200 is placed in the extension/support mode. Using the ski 54 and spindle as a lever, the operator must pull up on the ski loop, in the direction of arrow A shown in FIG. 10, and the ski 54 and associated suspension components will be raised. When the sled is raised, the distance B will be increased. The jack 200 will follow this change in distance and when the operator feels the ski is sufficiently elevated, the jack will hold that position when the ski loop is released. The operation is repeated for the other side.

If it becomes apparent that a ski or the skis are not elevated enough, the operator simply pulls up on the ski loop again and raises the ski higher. The jack will follow and hold the ski in a higher position. The jack 200 should remain in the extension/support mode until the reason for lifting is completed.

On going down, when the front end of the bottom cover is installed or other operations are completed, the sled and skis will need to be returned to their original positions.

With the jack in the extension/support mode, the operator places the jack in the retraction mode and pulls up on the ski loop in the direction A as shown in FIG. 10 to relieve the weight on the jack. When the weight is relieved, the jack will retract to its shortest length thereby allowing the ski 54 to be lowered to its original position. The operation is repeated for the other side. Afterwards, the jacks are removed from underneath the suspension components and are stored.

The cover device may be provided with a lining. Moreover, venting via the gas refueling opening may be provided for facilitating convective air flows during stationary coveredness. Also, the bottom of the cover device may be provided with drainage holes and hanging loops may be located on the ski pockets for hanging the cover when not in use.

The cover device and the concept thereof may also be used for application to other pieces of equipment such as recreational vehicles, all terrain vehicles, jet skis and the like.

In operation of the protective cover device 24 according to the present invention, first, the snowmobile 10 is positioned on the bed of a trailer (not shown). Next, an optional dust cover or the like (not shown) is fitted over the snowmobile. The dust cover is used to provide additional prevention of any abrasion between the inside of the cover device 24 and the paintwork of the snowmobile. The combined first and second pocket 50 and 52 and panel 58 is then positioned in front of the skis 22. Preferably, the panel 58 is formed into a roll in order to facilitate placement and alignment of the panel 58. A block of wood or other implement, to be described later, is placed under one of the ski supports using the ski 54 as a lever to facilitate lifting, so that the ski 54 can be easily lifted clear of the bed of the trailer. With the ski 54 lifted a few inches from the bed of the trailer, the ski 54 is then fitted into the pocket 50. The operation is repeated for the other ski 56 so that the ski 56 is fitted within the pocket 52. The skis 54 and 56 are subsequently lowered and the roll of the panel 58 is consequently at this stage located just behind the skis 54 and 56. A lifting jack or the like is then used to raise the track 20 slightly from the bed of the trailer so that the panel 58, which is the second half of the bottom portion of the cover device, can be rolled out and placed under the track 20 and correctly aligned with the snowmobile 10. The lifting jack is then lowered.

The first portion 26 is then fitted over the dust cover and snowmobile. When the first portion 26 has been fitted snugly over the engine compartment 12, windshield 14, handlebars 16 and seat 18, the first row of teeth 62 of the zipper 60 are pulled down so that the first row of teeth 62 of the zipper encircle the snowmobile 10. The flap 66 is folded upwardly to the second disposition thereof as shown in FIG. 2 and the first and second row of zipper teeth 62 and 64 respectively of the zipper 60 are aligned relative to each other. The rows 62 and 64 are then zipped together so that the first and second portions 26 and 28 define the enclosure 32 for protecting the snowmobile.

Finally, the flap 66 is folded down over the zipper 60 and the cinch strap 70 is threaded under the panel 58. The second end 74 of the cinch strap 70 is fastened to the first portion 26 as shown in FIG. 9 and is tightened.

In order to remove the cover device 24, the reverse procedure is utilized. The cover device 24 can easily be stowed in the back of the truck during snowmobiling.

The present invention provides a unique protective cover for completely covering a snowmobile during transportation thereof so that the snowmobile is enclosed within the cover and thus protected from the corrosive effects of slush, salt, sand and ice thrown towards the snowmobile during such transportation.

What is claimed is:

1. For use with a snowmobile having an engine compartment, windshield, handlebars, seat, track and skis, a protective cover device for protecting the snowmobile from the elements during transportation thereof, said device comprising:
   a first portion for covering and protecting the engine compartment, windshield, handlebars and seat;
   a second portion for covering and protecting the track and skis; and
   means for removably sealing said first and second portions together such that when said first and second portions are sealed together, said first and second portions define therebetween an enclosure for the snowmobile so that during transportation of the snowmobile, ingress of the elements including $H_2O$, snow, slush and road contaminants onto the snowmobile is inhibited, the arrangement being such that the snowmobile is completely protected and insulated from the elements that would otherwise tend to damage, corrode and reduce the usefulness of the snowmobile in the absence of said cover device.

2. A protective cover device as set forth in claim 1 wherein said first portion includes:
   a plurality of sections, said sections being secured relative to each other so that said first portion conforms to a contour of the engine compartment, windshield, handlebars and seat of the snowmobile.

3. A protective cover device as set forth in claim 2 wherein said sections are secured relative to each other by stitching.

4. A protective cover device as set forth in claim 2 wherein said sections are fabricated from a waterproof reinforced material.

5. A protective cover device as set forth in claim 2 wherein said plurality of sections includes:
   at least a first and a second section for covering the engine compartment;
   at least a third section for covering the windshield;
   at least a fourth section for covering the handlebars;
   at least a fifth section for covering the seat.

6. A protective cover device as set forth in claim 2 wherein a fifth section defines a selectively closable opening for venting and for permitting refueling of the snowmobile during transportation thereof without having to remove said first portion.

7. A protective cover device as set forth in claim 2 wherein a fifth section further defines a storage compartment.

8. A protective cover device as set forth in claim 1 wherein said second portion includes:
   a first pocket for the reception therein of one of the skis of the snowmobile;
   a second pocket for the reception therein of another of the skis of the snowmobile;
   a panel permanently secured to said first and second pockets for covering and protecting the track of the snowmobile from the elements.

9. A protective cover device as set forth in claim 8 wherein said first and second pockets are secured to said panel by stitching.

10. A protective cover device as set forth in claim 8 wherein said first and second pockets and said panel are fabricated from a durable reinforced waterproof material.

11. A protective cover device as set forth in claim 1 wherein said means for removably sealing said first and second portions together includes:
    a zipper.

12. A protective cover device as set forth in claim 11 wherein said zipper includes:
    a first row of zipper teeth secured to said first portion;
    a second row of zipper teeth secured to said second portion, said first and said second row of zipper teeth cooperating with each other for selectively sealing said first and second portions together;
    a flap for covering said zipper when said portions are sealed together, said flap being arranged such that in a first disposition thereof, said flap is folded over said first and second rows of zipper teeth and in a second disposition of said flap, said flap is folded back to expose said first and second row of teeth so that unzipping of said rows of teeth is facilitated.

13. A protective cover device as set forth in claim 12 wherein said zipper further includes:
    a hook and loop fastener for fastening said flap in said first disposition thereof.

14. A protective cover device as set forth in claim 1 wherein said means for removably sealing said first and second portions together includes:
    a hook and loop fastener for fastening and sealing said first and second portions together.

15. For use with a snowmobile having an engine compartment, windshield, handlebars, seat, track and skis, a protective cover device for protecting the snowmobile from the elements during transportation thereof, said device comprising:
- a first portion for covering and protecting the engine compartment, windshield, handlebars and seat;
- a second portion for covering and protecting the track and skis;
- means for removably sealing said first and second portions together such that when said first and second portions are sealed together, said first and second portions define therebetween an enclosure for the snowmobile so that during transportation of the snowmobile, ingress of the elements including H₂O, snow, slush and road contaminants onto the snowmobile is inhibited, the arrangement being such that the snowmobile is completely protected and insulated from the elements that would otherwise tend to damage, corrode and reduce the usefulness of the snowmobile in the absence of said cover device;
- a cinch strap having a first and a second end;
- said first end of said cinch strap being permanently secured to said first portion; and
- said second end of said cinch strap extends around said second portion and is removably fastened to said first portion for preventing billowing of said first portion during transportation of the snowmobile.

16. For use with a snowmobile having an engine compartment, windshield, handlebars, seat, track and skis, a protective cover device for protecting the snowmobile from the elements during transportation thereof, said device comprising:
- a first portion for covering and protecting the engine compartment, windshield, handlebars and
- a second portion for covering and protecting the track and skis;
- means for removably sealing said first and second portions together such that when said first and second portions are sealed together, said first and second portions define therebetween an enclosure for the snowmobile so that during transportation of the snowmobile, ingress of the elements including H₂O, snow, slush and road contaminants onto the snowmobile is inhibited, the arrangement being such that the snowmobile is completely protected and insulated from the elements that would otherwise tend to damage, corrode and reduce the usefulness of the snowmobile in the absence of said cover device; and
- said means for removably sealing including:
  - a zipper having a first and a second row of zipper teeth, said first and second rows being secured respectively to said first portion and said second portion of said cover device.

17. For use with a snowmobile having an engine compartment, windshield, handlebars, seat, track and skis, a protective cover device for protecting the snowmobile from the elements during transportation thereof, said device comprising:
- a first portion for covering and protecting the engine compartment, windshield, handlebars and seat;
- a second portion for covering and protecting the track and skis;
- means for removably sealing said first and second portions together such that when said first and second portions are sealed together, said first and second portions define therebetween an enclosure for the snowmobile so that during transportation of the snowmobile, ingress of the elements including H₂O, snow, slush and road contaminants onto the snowmobile is inhibited, the arrangement being such that the snowmobile is completely protected and insulated from the elements that would otherwise tend to damage, corrode and reduce the usefulness of the snowmobile in the absence of said cover device; and
- said means for removably sealing including:
  - a fastener, said fastener including:
    - a hook element and a hook engaging element, said hook and hook engaging elements being secured respectively to said first portion and said second portion of said cover device for sealing together said first and second portions of said protective cover device.

* * * * *

UNITED STATES PATENT AND TRADEMARK OFFICE
CERTIFICATE OF CORRECTION

PATENT NO.     : 6,478,363 B2
DATED          : November 12, 2002
INVENTOR(S)    : Peter Jensen It is certified that error appears in the above-identified patent and that said Letters Patent is hereby corrected as shown below:

<u>Column 4,</u>
Line 45, delete "A" first occurrence.

Signed and Sealed this

First Day of July, 2003

JAMES E. ROGAN
*Director of the United States Patent and Trademark Office*